United States Patent
Neutra (10) Patent No.: US 11,137,973 B2
(45) Date of Patent: Oct. 5, 2021

(54) AUGMENTED AUDIO DEVELOPMENT PREVIEWING TOOL

(71) Applicant: Bose Corporation, Framingham, MA (US)

(72) Inventor: Matthew Eliot Neutra, Sherborn, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/559,721

(22) Filed: Sep. 4, 2019

(65) Prior Publication Data

US 2021/0064330 A1    Mar. 4, 2021

(51) Int. Cl.
| | |
|---|---|
| *G06F 3/16* | (2006.01) |
| *G06F 3/0482* | (2013.01) |
| *G06F 3/0484* | (2013.01) |
| *H04R 1/10* | (2006.01) |
| *H04S 7/00* | (2006.01) |

(52) U.S. Cl.
CPC ............ *G06F 3/165* (2013.01); *G06F 3/0482* (2013.01); *G06F 3/04845* (2013.01); *G06F 3/04847* (2013.01); *H04R 1/1041* (2013.01); *H04S 7/304* (2013.01); *H04R 2430/01* (2013.01)

(58) Field of Classification Search
CPC ........ G06F 3/011; G06F 3/165; G06F 3/0482; G06F 3/04845; G06F 3/04847; H04R 1/1041
See application file for complete search history.

(56) References Cited

U.S. PATENT DOCUMENTS

| | | | |
|---|---|---|---|
| 7,754,955 B2 * | 7/2010 | Egan .................... | G09B 15/023 84/600 |
| 9,864,580 B2 * | 1/2018 | Ben-Tzur ................. | G06F 8/24 |
| 10,080,094 B2 * | 9/2018 | Ugur .................... | G10L 21/0216 |
| 10,206,055 B1 * | 2/2019 | Mindlin .................. | H04S 7/304 |
| 10,643,592 B1 * | 5/2020 | Barbone ............... | G10H 1/0066 |
| 10,656,903 B1 * | 5/2020 | Hirst ...................... | A63F 13/25 |
| 10,701,303 B2 * | 6/2020 | Wang ...................... | H04N 5/04 |
| 2010/0191728 A1 * | 7/2010 | Reilly ................ | H04N 1/00167 707/736 |

(Continued)

OTHER PUBLICATIONS

Tim Welsh, "It feels instantaneous, but how long does it really take to think a thought?", Jun. 26, 2015.*

*Primary Examiner* — Jennifer N Welch
*Assistant Examiner* — Amy P Hoang
(74) *Attorney, Agent, or Firm* — Hoffman Warnick LLC (57) ABSTRACT

Various implementations include computing devices and related computer-implemented methods for developing and previewing audio pins in an augmented audio environment. Certain implementations include a computer-implemented method including: generating a digital audio workstation (DAW) on a display, the DAW including a set of inputs assignable to an audio pin for playback; receiving assigned inputs for the audio pin from selections by a user at the display or at a wearable audio device worn by the user; and rendering the assigned inputs as audio playback at the wearable audio device worn by the user to preview the audio playback associated with the audio pin, where the set of inputs are configured to be rendered as audio playback at the wearable audio device worn by the user in real time as the inputs are assigned.

14 Claims, 6 Drawing Sheets

(56) References Cited

U.S. PATENT DOCUMENTS

| 2014/0270181 | A1* | 9/2014 | Siciliano | H04S 7/00 |
| | | | | 381/17 |
| 2015/0063610 | A1* | 3/2015 | Mossner | H04S 5/005 |
| | | | | 381/307 |
| 2018/0150275 | A1* | 5/2018 | Mate | G06F 3/165 |
| 2020/0097248 | A1* | 3/2020 | Wood | H04S 7/302 |
| 2020/0221248 | A1* | 7/2020 | Eubank | G06F 3/165 |

* cited by examiner

AUGMENTED AUDIO DEVELOPMENT PREVIEWING TOOL

TECHNICAL FIELD

This disclosure generally relates to augmented reality (AR) audio experiences. More particularly, the disclosure relates to approaches for developing and previewing AR audio experiences in audio devices, such as wearable audio devices.

BACKGROUND

Portable electronic devices, including headphones, audio eyeglasses and other wearable audio systems are becoming more commonplace. These portable electronic devices can enable more immersive user experiences, for example, using audio to augment the user's perception of the surrounding world. However, these conventional systems fail to capitalize on the various benefits that augmented audio can provide.

SUMMARY

All examples and features mentioned below can be combined in any technically possible way.

Various implementations include computer-implemented methods, devices and systems for developing augmented reality (AR) audio experiences. Certain implementations include approaches for previewing AR audio experiences as they are developed in real time.

In some particular aspects, a computer-implemented method includes: generating a digital audio workstation (DAW) on a display, the DAW including a set of inputs assignable to an audio pin for playback; receiving assigned inputs for the audio pin from selections by a user at the display or at a wearable audio device worn by the user; and rendering the assigned inputs as audio playback at the wearable audio device worn by the user to preview the audio playback associated with the audio pin, where the set of inputs are configured to be rendered as audio playback at the wearable audio device worn by the user in real time as the inputs are assigned.

In other particular aspects, a wearable audio device includes: at least one transducer configured to provide an audio output; an orientation tracking system for tracking an orientation of a user; and a control system coupled with the at least one transducer and the orientation tracking system, the control system configured to: send orientation tracking data about the user to a smart device, the smart device displaying a representation of the user in a digital audio workstation (DAW) on a display for assigning a set of inputs to an audio pin for playback; receive instructions from the smart device to initiate audio playback of at least one of the assigned inputs based upon the orientation tracking data and a representation of the assigned inputs relative to the representation of the user in the DAW; and initiate audio playback of the at least one assigned input at the at least one transducer, where the at least one assigned input is configured to be rendered as audio playback at the at least one transducer in real time as each input is assigned.

In additional particular aspects, a system includes: a smart device including a display for displaying a digital audio workstation (DAW) including a set of inputs assignable to an audio pin for playback; and a wearable audio device connected with the smart device, the wearable audio device including: at least one transducer configured to provide an audio output; an orientation tracking system for tracking an orientation of a user; and a control system coupled with the at least one transducer and the orientation tracking system, the control system configured to: send orientation tracking data about the user to the smart device, the smart device displaying a representation of the user in the DAW; receive instructions from the smart device to initiate audio playback of at least one assigned input in the set of inputs based upon the orientation tracking data and a representation of the at least one assigned input relative to the representation of the user in the DAW; and initiate audio playback of the at least one assigned input at the at least one transducer, where the at least one assigned input is configured to be rendered as audio playback at the at least one transducer in real time as each input is assigned.

Implementations may include one of the following features, or any combination thereof.

In some cases, adjustments to the set of inputs are configured to be rendered as audio playback at the wearable audio device worn by the user in real time as the inputs are assigned.

In particular aspects, the set of inputs include audio content selections assignable to the audio pin, where the audio content selections include quad audio, stereo audio or mono audio.

In certain cases, the set of inputs further include: a position of each of the audio content selections; a volume level for each of the audio content selections; and a triggering mechanism for playback of at least one of the audio content selections.

In particular cases, the method further includes converting the assigned inputs to an audio file for subsequent rendering as the audio playback.

In some aspects, converting the assigned inputs to a stereo audio file is performed at a cloud computing system connected with the wearable audio device.

In certain cases, the display is located on a smart device.

In particular implementations, the DAW is part of an application programming interface (API) that allows an API-calling component to render the assigned inputs as audio playback at the wearable audio device.

In some aspects, the method further includes: displaying a representation of the user in the DAW on the display; and displaying a representation of the assigned inputs relative to the representation of the user in the DAW on the display.

In certain implementations, the assigned inputs are rendered as spatialized audio at the wearable audio device based upon the representation of the assigned inputs relative to the representation of the user in the DAW.

In particular cases, the method further includes determining an orientation of the user based upon orientation data from the wearable audio device, where the representation of the user in the DAW is based upon the orientation data.

In some implementations, in response to movement by the user, the method further includes updating the representation of the user in the DAW on the display and updating the spatialized audio based on the representation of the assigned inputs relative to the updated representation of the user in the DAW on the display.

In certain aspects, the DAW and the wearable audio device enable the user to perform developer-side functions to adjust the audio playback and hear the adjusted audio playback in real time as an end-user.

In some cases, the method further includes assigning the audio pin to a scene in an augmented audio environment for subsequent playback to a distinct user.

In particular aspects, the audio pin is assigned to a geographic location and is configured to be triggered by the distinct user when the distinct user is located proximate the geographic location in the augmented audio environment.

In certain cases, the method further includes: assigning the audio pin to a scene in an augmented audio environment, where the audio pin is one a plurality of audio pins in the augmented audio environment each with assigned inputs; and in response to detecting movement of the user to a location associated with one or more of the plurality of audio pins, rendering the assigned inputs for the audio pin as audio playback at the wearable audio device worn by the user to preview the audio playback associated with the audio pin.

In some implementations, the at least one transducer plays back the at least one assigned input as spatialized audio based upon the representation of the assigned set of inputs relative to the representation of the user in the DAW.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a pin in an augmented audio environment can be previewed to enhance development of that audio pin. Certain implementations include tools and approaches for generating a digital audio workstation (DAW) that allows a user to render inputs as audio playback and experience that audio playback in real time, e.g., as an end user.

As noted herein, conventional interfaces for developing augmented reality (AR) audio experiences are designed for professional programmers with significant experience in one or more programming languages. These interfaces limit the number and type of developers that can contribute to AR audio platforms, and consequently, limit the end-user experience. Additionally, these interfaces have long feedback loops that prevent the developer from understanding and refining the end-user experience. In contrast to these conventional approaches, various implementations include approaches for generating and rendering DAW inputs with an intuitive, user-friendly interface. As compared with conventional platforms, the approaches disclosed according to various implementations can speed development and refinement of AR audio experiences, as well as enhance AR audio features in particular experiences.

Commonly labeled components in the FIGURES are considered to be substantially equivalent components for the purposes of illustration, and redundant discussion of those components is omitted for clarity.

Figure 1:
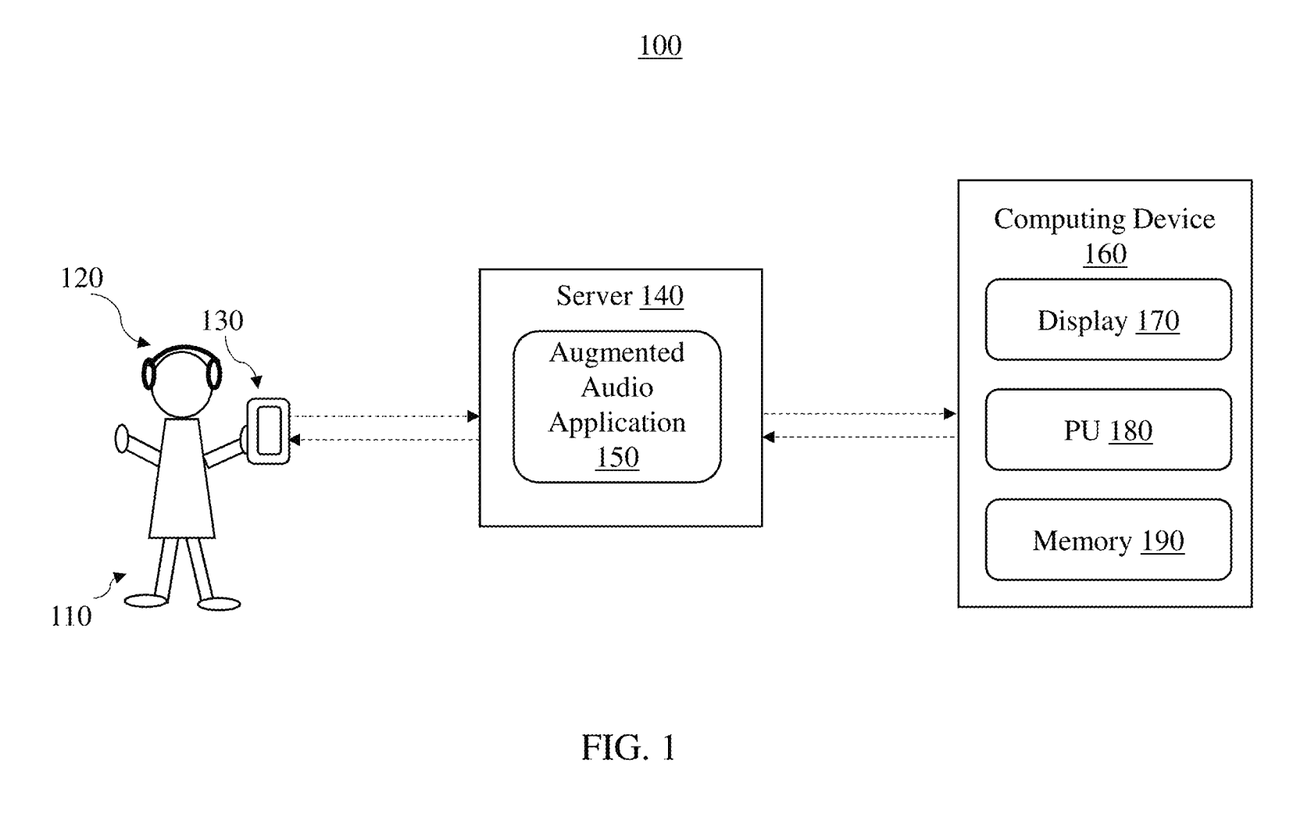
FIG. 1 is a data flow diagram illustrating interaction between devices in an environment according to various implementations.

Various implementations include a computing device for rendering an audio pin in an augmented audio environment. FIG. 1 illustrates an example environment 100, including a user 110 and an audio device 120. While the audio device 120 is illustrated in this example as a wearable audio device (e.g., headphones, earphones, audio glasses, open-ear audio devices, shoulder-worn speakers or wearable speakers), the audio device 120 can include any conventional audio device such as a portable speaker, smart speaker, etc. In some implementations, the audio device 120 is connected with a smart device 130. However, in other implementations, the audio device 120 can have integrated smart device capabilities (e.g., communications and data processing), such that a distinct smart device 130 is not necessary to perform functions described herein.

In particular cases, the smart device 130 includes a smart phone, smart watch or other wearable smart device, portable computing device, etc., and has an audio gateway, processing components, and one or more wireless transceivers for communicating with other devices in the environment 100. For example, the wireless transceiver(s) can be used to communicate with the audio device 120, as well as one or more connected smart devices within communications range. The wireless transceivers can also be used to communicate with a server 140 hosting a mobile application that is running on the smart device 130, for example, an augmented audio application 150. The server 140 can include a cloud-based server, a local server or any combination of local and distributed computing components capable of executing functions described herein. In various particular implementations, the server 140 is a cloud-based server configured to host the augmented audio application 150, e.g., running on the smart device 130. According to some implementations, the augmented audio application 150 is downloaded to the user's smart device 130 in order to enable functions described herein.

In certain cases, the server 140 is connected with a computing device 160 that enables coding of the augmented audio application 150, e.g., by a software developer or other programmer. In particular implementations, as described herein, the augmented audio application 150 can be coded by a user-developer or user-programmer that is able to experience real-time adjustments to audio playback at the audio device 130. That is, in these cases, the user 110 acts as both the end-user and the developer (or, programmer) to develop and/or refine one or more audio experiences.

In some example implementations, the computing device 160 is the same device as the smart device 130, and/or is an integral device within the smart device 130. In other example implementations, the computing device 160 is a device that is distinct from the smart device 130. In additional example implementations, the computing device 160 can include a cloud-based computing system that is accessible via a smart device (e.g., smart device 130) or other local computing device, e.g., via a web browser. In various implementations, the computing device 160 includes a display 170. In certain implementations, the display 170 includes a user interface such as a touch screen, graphical user interface or other visual interface. In cases where the computing device 160 is a smart device such as a smartphone or tablet, the display 170 includes the screen on that smart device. In other cases, the computing device 160 can include a PC, a smart television, a surface computing machine, etc., and the display 170 can be a separate physical device such as a monitor or projection screen. The computing device 160 can also include a processor (PU) 180 to execute instructions for generating a set of inputs to an application programming interface (API) on the display 170. In some cases, a memory 190 is coupled with the processor (PU) 180 to store the instructions. In other implementations, the processor 180 can otherwise access the instructions, e.g., from a remote storage system connected with the computing device 160. When executed by the processor 180, the instructions cause the processor 180 to generate a set of inputs to the API, as shown on the display 170.

The memory 190 can include, for example, flash memory and/or non-volatile random access memory (NVRAM). In some implementations, instructions (e.g., software) are stored in an information carrier. The instructions, when executed by one or more processing devices (e.g., the processor 180), perform one or more processes, such as those described elsewhere herein. The instructions can also be stored by one or more storage devices, such as one or more (e.g. non-transitory) computer- or machine-readable mediums (for example, the memory, or memory on the processor). As described herein, the memory 190 can include instructions, or the processor 180 can otherwise access instructions for generating DAW inputs on a display (for an augmented audio environment) according to various particular implementations. It is understood that portions of the memory (e.g., instructions) can also be stored in a remote location or in a distributed location, and can be fetched or otherwise obtained by the processor 180 (e.g., via any communications protocol described herein) for execution.

Figure 2:
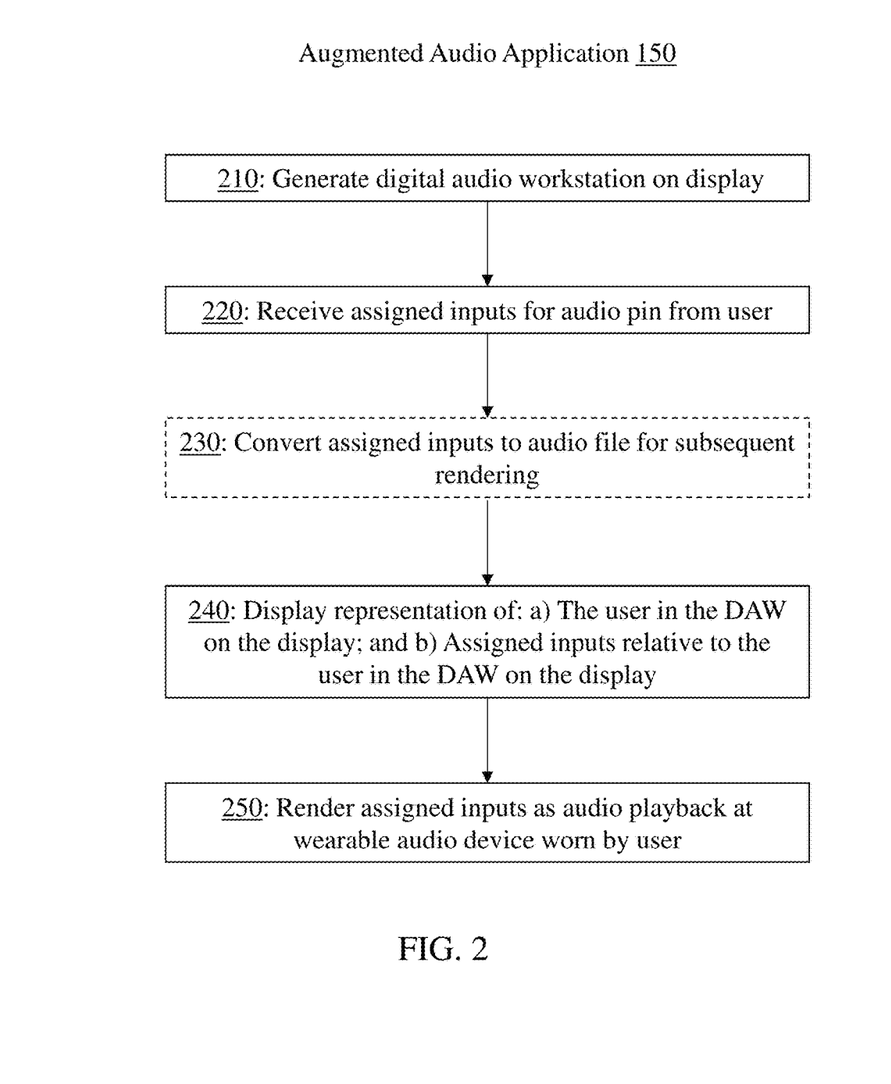
FIG. 2 is a flow diagram illustrating processes in a method according to various implementations.

FIG. 2 is a process flow diagram illustrating a computer-implemented method performed by the augmented audio application 150 (FIG. 1) according to various implementations. These processes are described with continuing reference to FIG. 1, as well as reference to the example interface illustrated in FIG. 3. In some cases, as described herein, processes shown sequentially can be performed simultaneously, or nearly simultaneously. However, in other cases, these processes can be performed in a different order.

Figure 3:
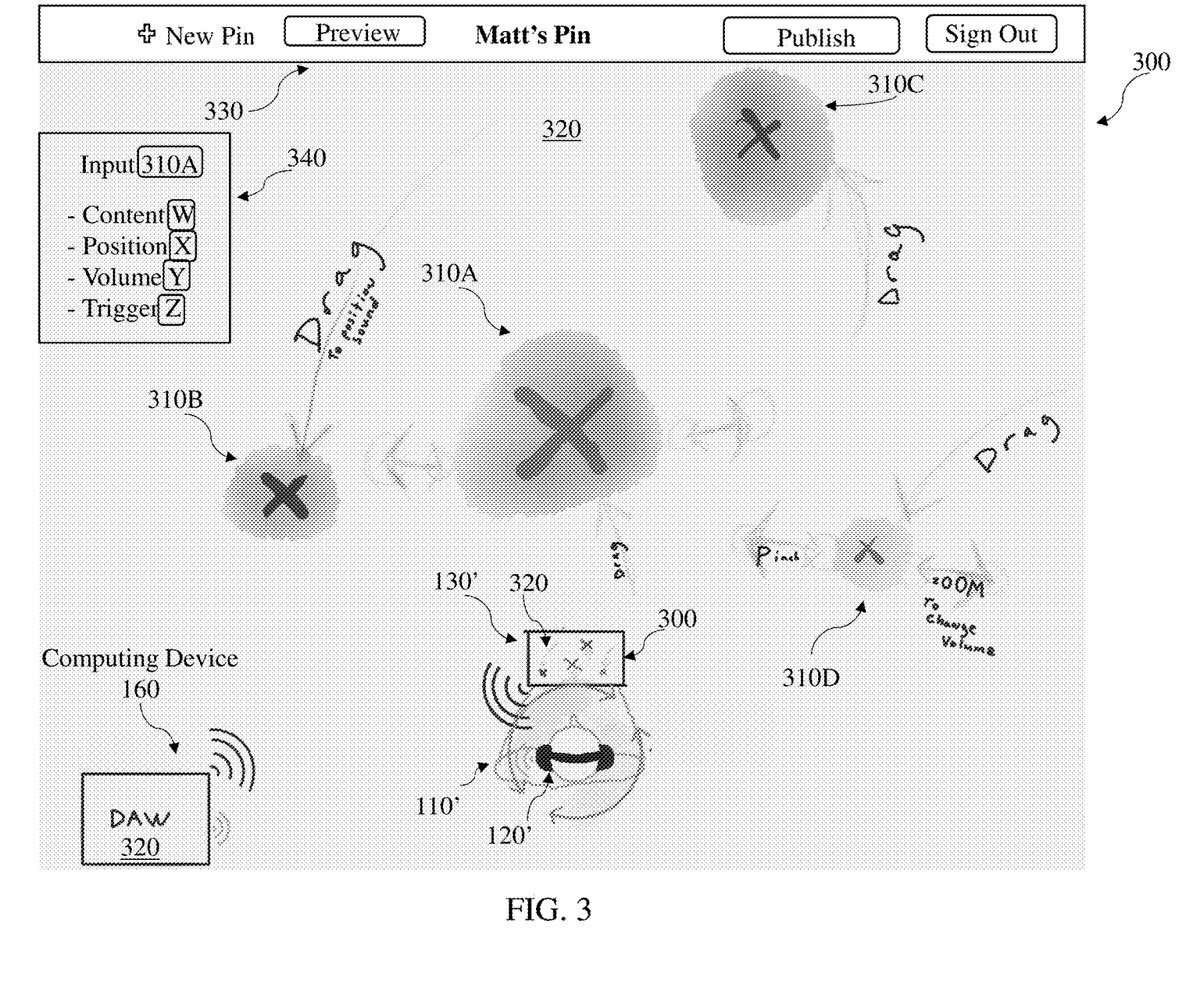
FIG. 3 is a schematic depiction of an example interface for providing inputs to a digital audio workstation (DAW) according to various implementations.

FIG. 3 is a schematic depiction of an example interface (e.g., graphical user interface) 300 displaying inputs 310 to a digital audio workstation (DAW) 320 for rendering an audio pin in an augmented audio environment. In various implementations, the augmented audio application 150 (FIG. 1) generates the DAW 320 at the interface 300 (process 210, FIG. 2). The DAW 320 is a specific form of application programming interface (API) that provides the user 110 with options for defining and/or refining aspects of an augmented audio environment. The DAW 320 and inputs 310 are shown in expanded view, including a representation 110' of the user 110. This expanded view illustrates the immersive nature of the augmented audio application 150 (FIG. 1), such that the user 110 is represented (as user 110') within the DAW 320, and is able to experience real-time adjustments made to one or more audio pins at the interface 300 with the audio device 120 (e.g., depicted as a wearable audio device, 120'). The interface 300 is rendered at the display 170 (FIG. 1), and provides the user 110 (e.g., a programmer or software developer) with inputs 310 used by the DAW 320 to render an audio pin in an augmented audio environment. In particular cases, the DAW 320 uses the inputs 310 to render audio playback at the audio device 120 worn by the user 110 as those inputs 310 are assigned, i.e., in real time. The smart device 130 is also represented in the DAW 320 as smart device 130'.

As described herein, a "scene" is a set of augmented audio experiences (also called "states") that are rendered as playback at an audio device (e.g., audio device 120). The audio playback can be related to the geographic location of a user, orientation of that user, the proximity of the user to other users or other locations, etc. Experiences (or, states) are initiated by events, which may be referred to as "triggering events." Transitions between experiences can also be defined by events. As noted herein, various implementations allow a programmer/user to create a scene that includes a set of (e.g., two or more) augmented audio experiences that can be triggered based upon a corresponding set of events. While in a given experience, audio playback is rendered at the user's audio device, and when a triggering event is detected, the audio playback is modified (e.g., a different file or stream is played, playback is stopped or paused, or the spatialized nature of the playback is adjusted) as the user transitions to another experience. "Audio pins" (or simply, "pins") are location-specific (e.g., geographic location-specific) sets of one or more audio experiences. That is, one or more audio experiences can be assigned to a particular location as an audio pin. The audio pin can be triggered in an augmented audio environment when the user enters the geographic location (e.g., a radius around the pin location). The various implementations described herein permit the programmer/user to define a scene using one or more audio pins, each of which can include experiences and events.

Returning to FIGS. 2 and 3, the user 110 can assign inputs 310 for one or more audio pin(s) using one or more interface command functions, e.g., click, click-and-drag, touch, touch-and-drag, keyboard commands, voice commands, gesture-based commands, etc. In some cases, the user 110 can create a pin by clicking or otherwise actuating an option on a pin selection menu 330. In certain cases, the pin selection menu 330 allows the user 110 to add pins and/or switch between pins for editing. In some implementations, pins are assigned ownership rights, or are editable only by select programmers/users, and as such, are not available for editing by all programmers/users. In additional implementations, pins can be edited by multiple programmers. The example of "Matt's Pin" is depicted in FIG. 3.

After selecting or otherwise creating a pin from the scene selection menu 330, the user 110 can assign (e.g., add and/or edit) inputs 310 to the DAW 320, which are received by the augmented audio application 150 (process 220, FIG. 2). In some cases, inputs 310 can include audio content selections that are assignable to the audio pin. For example, the audio content selections can include quad audio selections, stereo audio selections and/or mono audio selections. In some cases, audio content selections can include media (e.g., audio) files, streams or other sources of media content (e.g., voice audio content, musical audio content, ambiance audio content, or sound effect audio content) configured for playback at the audio device 120. In various implementations, the audio content selections are selectable from a menu that is linked with a file library or a listing of available audio streams that can be assigned to one or more experiences and/or scenes via the DAW 320. In various implementations, files are selected from a list of user uploaded and/or default audio files. As noted herein, files can be assigned by heading (also referred to as user look direction) in order to trigger distinct audio playback of files. It is understood that where the term "file" (e.g., audio file) is used in this disclosure, the term "stream" (e.g., audio stream) can be equally applicable.

Additionally, inputs 310 can include one or more of: a) a position of each of the audio content selections, b) a volume level for each of the audio content selections, and c) a triggering mechanism for playback of the audio content selection(s). In certain implementations, the augmented audio application 150 provides a menu 340 for selecting and/or adjusting features of the inputs 310 (e.g., content, position, volume, triggering mechanism, etc.). In particular examples, e.g., as shown in FIG. 3, the user can assign an audio content selection as a first input 310A. This audio content selection can include a stereo audio file or stream of a background track, e.g., music at a low decibel level. The user 110 can position the first input 310A at the approximate center of the DAW 320. Left (or, west) of the first input 310A is another input 310B that the user 110 can assign, e.g., a mono audio file or stream such as a voice recording of a virtual personal assistant (VPA), including playback of audio instructions (e.g., "move ahead toward the audio beacon"). Input 310C is assigned a mono or stereo audio file or stream that plays a repeating beacon sound, e.g., a ping or bell sound. Input 310C is intended to draw the user's attention in the forward-right (or, northeast) direction. In this example, input 310D is assigned a mono or stereo audio file or stream that plays another voice recording of the VPA when the user 110 gets off course, including playback of audio instructions (e.g., "you are off course; move left toward the audio beacon").

As indicated in the depiction in FIG. 3, the DAW 320 can allow the user to drag or otherwise move inputs 310 around the workspace (e.g., "drag", "pinch", etc.) to create the pin. In some cases, the inputs 310 can be manipulated within a location, e.g., pinched, scrolled over, tapped, etc. to change absolute or relative volume of playback. In additional implementations, inputs 310 can be adjusted (e.g., added, removed or edited) from the DAW 320 with gesture-based commands, e.g., as detected by and IMU or other gesture tracking system at the audio device 120 and/or smart device 130. For example, in certain cases, the augmented audio application 150 is configured to detect gestures made by the user 110 with the audio device 120 and/or smart device 130 while the DAW 320 is activated in order update the inputs 310 to the DAW 320. In particular examples, where the audio device 120 includes a head or shoulder-worn wearable audio device, the augmented audio application 150 detects a user head movement (e.g., nod or shake) to accept an input 310, reject an input 310, add an input 310, remove an input 310, switch an input 310, etc. In these cases, the augmented audio application 150 uses data about user motion (e.g., from the IMU or other motion tracking device(s)) to adjust inputs 310 at the DAW 320. In one specific example, in response to a user gesture such as a head nod or shake of the head, the augmented audio application 150 adds an input 310 to the DAW 320 or removes an existing input 310 from the DAW 320, respectively. Additional gestures can be used to adjust inputs in these cases, e.g., single and/or multi-tap gestures detected at the audio device 120, swipe and/or hold gestures detected at a capacitive touch interface (e.g., at audio device 120 or smart device 130), etc. In other cases, for example, where the smart device 130 is a wearable smart device such as a smart watch, the augmented audio application 150 is configured to add and/or remove inputs 310 to the DAW 320 in response to detecting a set of defined gestures at the smart device 130 while the DAW 320 is activated (e.g., swipe up to add an input 310, swipe down to remove an input 310, and hold to assign an input 310).

In some cases, in order to assign an input 310, the user 110 must take an action (e.g., click and hold, select another input 310, hit a key (e.g., "enter") or provide a voice command (e.g., "assign")). In other cases, the inputs 310 are assigned after no adjustment is made to that input 310 for a period (e.g., several seconds or more). In still other cases, inputs 310 are assigned in response to gestures and/or voice commands, e.g., in response to detecting a user head nod, touch-and-hold gesture, or affirmative voice command such as "Assign input". In particular implementations, the augmented audio application 150 does not assign inputs 310 until receiving an affirmation that the editing process is complete, e.g., a response to a prompt such as "Are you finished assigning inputs?", "Assign input(s)?", or "Nod to assign inputs."

In any case, the assigned inputs 310 are displayed relative to the representation of the user 110' in the DAW 320 on the display 170 (process 240, FIG. 2). That is, the assigned inputs 310 are displayed relative to the representation of the user 110', while the augmented audio application 150 tracks the actual location and orientation of the user 110 in physical space. As described herein, while the user 110 moves in physical space, the representation of the user 110' is updated in the DAW 320 relative to the assigned inputs 310. Even further, as described herein, the audio playback at the user's audio device 120 is altered based upon changes to the representation of the user 110' relative to the assigned inputs 310 in the DAW 320.

Within the larger context of an augmented audio environment including a plurality of scenes and audio pins, the augmented audio application 150 can allow the user 110 to assign additional features of the inputs 310, such as: a media library input, an experience state input for defining a set of experiences, and an event toolbar input for defining transitions between the experiences. Additional details of inputs 310 are described in U.S. patent application Ser. No. 16/539, 480 ("Augmented Audio Development Tool"), filed on Aug. 13, 2019 and herein incorporated by reference in its entirety.

In some cases, as noted herein, the DAW 320 allows the programmer to assign an audio pin to a geographic location (e.g., a specific GPS location) and/or to a location relative to the user (e.g., a relative direction with respect to the user, such as a point north, west, etc. of the user). In various implementations, the user heading is determined based upon the orientation of the audio device 120 when the augmented audio application 150 is initiated. In certain cases, this user heading is considered "relative North" for the purposes of determining relative location and assignment of orientation-specific audio. Additional approaches for assigning audio pins can alternatively, or additionally, include coordinate entries, relative position/direction designations, landmark-based location identification, text-based entries, etc.

In cases where the programmer assigns an audio pin to a geographic location (e.g., specific GPS location), the DAW 320 can include a preview selection mechanism (e.g., Preview button, shown on pin selection menu 330) for triggering aspects of the audio pin as though the user 110 is physically located at the geographic location of the audio pin. That is, in response to the user 110 actuating the preview selection mechanism (e.g., Preview button or other button or user interface command described herein), the augmented audio application 150 can provide the user 110 with the augmented audio experience assigned to a geographic location without requiring that the user 110 travel to that location. In these implementations, the user 110 can actuate any of the inputs 310 in the DAW 320 (e.g., via click command, touch command, voice command or any selection command described herein) to initiate audio playback associated with that input 310, e.g., in the spatialized manner depicted in the interface 300. In some cases, in response to user actuation of the preview command (e.g., clicking Preview button), the augmented audio application 150 generates a list or other display of the assigned inputs 310 in the DAW 320 to enable the user 110 to "play" through a sequence of inputs 310, e.g., with forward (e.g., "next"), or backward (e.g., "previous") commands. In other cases, after detecting actuation of the preview command (e.g., Preview button), the augmented audio application 150 responds to detected physical movement by the user 110 to render audio playback at the audio device 120 according to the proximity and orientation of the depiction of the user 110' to the inputs 310 in the DAW 320. In these cases, in response to actuation of the preview command, the augmented audio application 150 essentially "drops" the representation of the user 110' into the interface 300, as though the user 110 were physically present at the location of the audio pin. As the user 110 moves in physical space, the corresponding representation of the user 110' moves within the interface 300 and audio playback is rendered at the audio device 120 according to relative position and/or orientation of the depiction of the user 110' to the inputs 310.

In various implementations, after receiving the assigned inputs entered by the user 110 at the DAW 320, the augmented audio application 150 is configured to convert the assigned inputs 310 to an audio file for subsequent rendering (process 230, illustrated as optional in FIG. 2). In these cases, the augmented audio application 150 converts the assigned inputs to the audio file at a cloud computing system that is connected with the audio device 120, e.g., where the computing device 160 is a cloud computing device. In various implementations, the audio file can include multiple channels configured for spatialized playback. In a particular implementation, the audio file includes an audio file with up to eight channels (e.g., in an M1SDK format). It is understood that in various implementations, processes 230 and 240 depicted in FIG. 2 can be performed at approximately the same time, or can be performed in reverse order.

An additional process (not shown in FIG. 2) can include mapping the audio file to a scene in an augmented audio environment (e.g., including a plurality of audio pins assigned to distinct audio files). In these cases, the augmented audio application 150 can include a transcoder/encoder, or utilize a transcoder/encoder at the server 140 and/or computing device 160 for assigning the audio file to the scene in an augmented audio environment. The transcoder/encoder can assign the audio file to a particular geographic location in an augmented audio environment, e.g., by assigning the audio file to latitude and longitude readings describing a geographic (e.g., GPS) trigger, or the unique ID of a geographic beacon (e.g., an iBeacon) trigger, etc.

In various implementations, after receiving the assigned inputs (and in some cases converting the assigned inputs to an audio file and mapping the file to a scene), the method can include rendering the assigned inputs 310 as audio playback at the audio device 120 worn by the user 110 (process 250, FIG. 2). In various implementations, the inputs 310 are configured to be rendered as audio playback at the audio device 120 worn by the user 110 in real time as the inputs 310 are assigned. In some cases, the time between assigning the inputs 310 in the DAW 320 and rendering the assigned inputs 310 as audio playback at the audio device 120 is equal to or less than approximately 90-150 milliseconds (ms), and in particular cases is equal to or less than approximately 120 ms.

In particular implementations, with continuing reference to FIG. 3, the assigned inputs 310 are rendered as spatialized audio at the audio device 120 based upon the representation of the assigned inputs 310 relative to the representation of the user 110'. That is, the assigned inputs 310 can be mixed in an audio file (or audio stream) configured for spatialized playback at the audio device 120 based upon the relative position and orientation of the representation of the user 110' with respect to the inputs 310.

In various implementations, the augmented audio application 150 is configured to determine an orientation of the user based upon orientation data from the audio device 120, e.g., where the audio device 120 is a wearable audio device. In some cases, the audio device 120 includes an orientation tracking system such as an inertial measurement unit (IMU), gyroscope/accelerometer/magnetometer, and/or optical tracking system for detecting an orientation of the user 110 (e.g., a look direction of the user 110). In various implementations, the orientation tracking system sends orientation information to the augmented audio application 150 on a periodic or on-demand basis. In other cases, the orientation tracking system sends orientation information to the augmented audio application 150 in response to detecting an orientation change at the audio device 120. In additional implementations, the orientation tracking system is configured to track user movement as well as changes in orientation, for example, with the IMU, gyroscope/accelerometer/magnetometer and/or optical tracking system. In further implementations the augmented audio application 150 also receives orientation and/or movement-related data from an orientation tracking system on the smart device 130 (e.g., IMU, gyroscope/accelerometer/magnetometer, etc.) for use in determining the position and orientation of the user 110.

Figure 4:
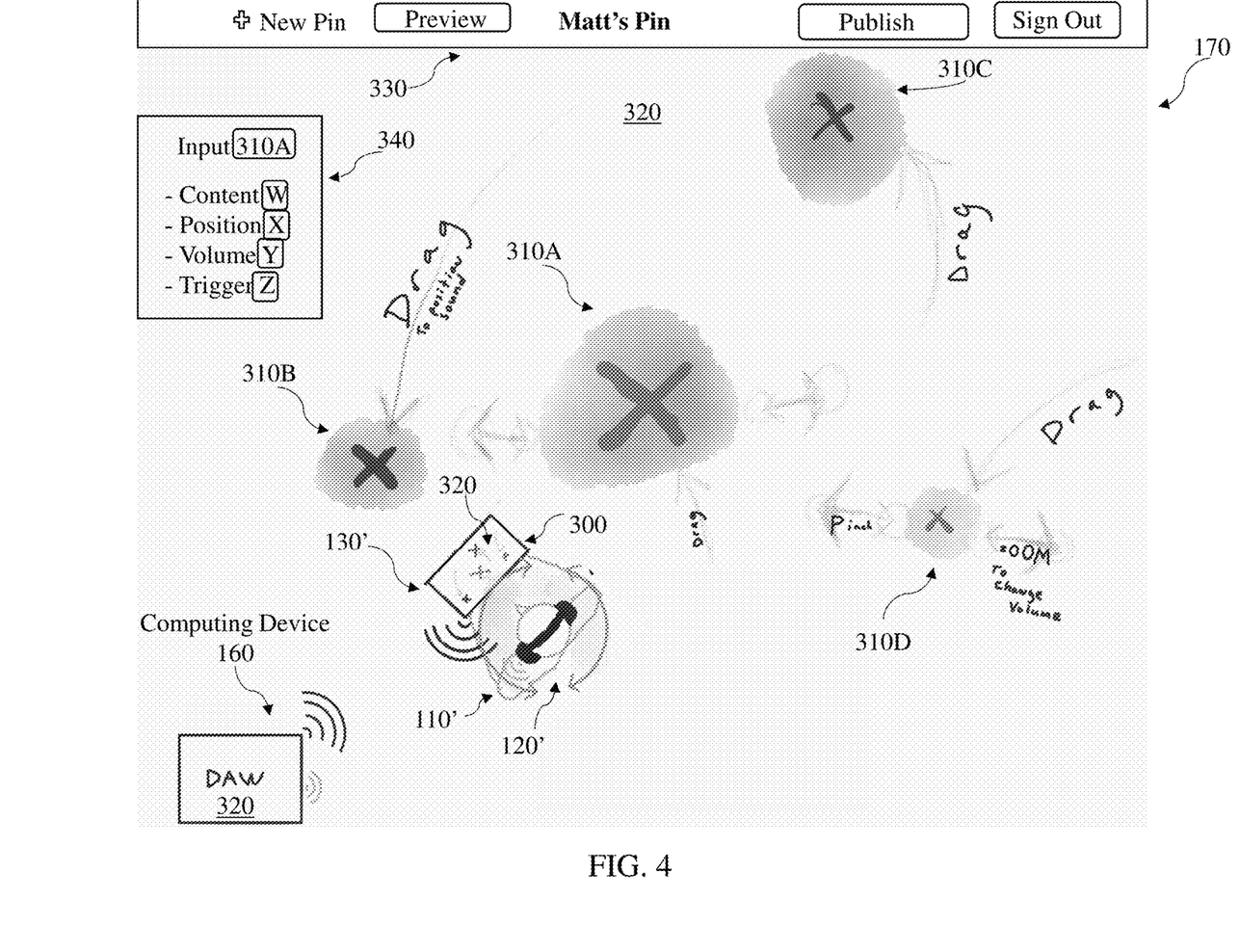
FIG. 4 shows an updated depiction of the example interface of FIG. 3 after adjusting for user movement.

In various implementations, the augmented audio application 150 is configured to update the representation of the user 110' in the DAW 320 in response to detecting movement of the user 110 (e.g., via the orientation tracking system or other location-based tracking system(s) such as a global positioning system (GPS), a network-based location tracking system (e.g., using Wi-Fi or other network-based triangulation) or a device-based location tracking system (e.g., using Bluetooth triangulation)). The augmented audio application 150 is also configured to update the spatialized audio playback based upon the representation of the assigned inputs 310 relative to the updated representation of the user 110' in the DAW 320. FIG. 4 depicts an updated DAW 320 that reflects a change in the position of the user 110 in physical space by illustrating the updated representation of the user 110'. In this case, the user 110 has moved forward and to the left (or, northwest) of her original location shown in FIG. 3. That is, the augmented audio application 150 receives data indicating movement of the user 110 in physical space, and updates the representation of that user 110' in the DAW 320. Additionally, the augmented audio application 150 updates the spatialized audio playback at the audio device 120 to reflect the user's movement. In the particular example depicted in FIG. 4, the augmented audio application 150 adjusts the directionality and volume (or, sound pressure level, SPL) of the playback assigned to inputs 310, e.g., inputs 310A and 310B are played at a greater SPL in the scenario depicted in FIG. 4 than in the scenario depicted in FIG. 3. Additionally, the directionality of the playback assigned to inputs 310 is adjusted between scenarios depicted in FIG. 4 versus FIG. 3, for example, playback of audio assigned to input 310B appears to originate from a direction in front of the user 110 when the user moves to the position depicted in FIG. 4, while playback of audio assigned to input 310A appears to originate from a direction to the right (e.g., east) of the user 110. This is in contrast to playback of the same audio assigned to inputs 310A and 310B while the user is in the position depicted in FIG. 3, where playback of audio assigned to input 310A appears to originate from a direction in front of the user 110, while playback of audio assigned to input 310B appears to originate from a direction to the left and in front (e.g., northwest) of the user 110. As noted herein, the augmented audio application 150 can be configured to receive data about changes in the position of the user 110 (e.g., including location and orientation), and adjust spatialized audio playback of one or more inputs 310 based upon that position data. Similarly, as the user 110 adjusts the position of one or more inputs 310 within the DAW 320 (regardless of whether the user 110 changes position/orientation), the augmented audio application 150 adjusts the spatialized audio playback of the modified input(s) 310 to reflect the change in location or other parameters relative to the depiction of the user 110'.

Additional details of augmented audio conditions (also referred to as triggering events) such as orientation and/or location changes and how such events (or, conditions) can be detected in order to render an augmented audio environment are described in U.S. patent application Ser. No. 16/289,940 ("Augmented Reality Audio Playback Control"), filed on Mar. 1, 2019 and herein incorporated by reference in its entirety.

In certain cases, the audio file (or stream) includes a spatialized audio file (or stream) configured for playback (which in some examples is binaural). In these cases, the audio file is configured for output at a spatially rendered audio location, or multiple spatially rendered audio locations, relative to the user 110 (FIG. 1). For example, the spatialized audio file can be configured for playback at one or more spatially rendered audio locations relative to the user's look direction (e.g., as detected by sensors on the audio device 120 and/or smart device 130), or relative to a physical location proximate the user 110 (FIG. 1). In certain cases, the audio file(s) can include one or more of a narrative audio file (e.g., introducing content) and an interactive audio file (e.g., for playback in response to a user action). Additional description of narrative audio files and interactive audio files is included in U.S. patent application Ser. No. 16/289,932 ("Augmented Audio Development"), filed on Mar. 1, 2019, and herein incorporated by reference in its entirety.

In various implementations, the augmented audio application 150 also allows the user 110 to assign the audio pin to a scene in an augmented audio environment for subsequent playback. In some cases, the audio pin is triggered by the user 110, e.g., while previewing the augmented audio environment. In other cases, the audio pin is triggered by a distinct user running the augmented audio application 150, e.g., on an audio device and/or connected smart device. In any case, the user 110 can assign the audio pin, including inputs 310 illustrated in FIG. 3, to a scene in an augmented audio environment. In various implementations, the audio pin is one of a plurality of audio pins in the augmented audio environment, where each pin has assigned inputs 310. In certain cases, the audio pin is assigned to a geographic location and is configured to be triggered by a user when that user is located proximate the geographic location in the augmented audio environment, e.g., when the user enters a defined radius around the geographic location. As described herein, in response to detecting movement of the user to a location associated with one or more of the audio pins, the augmented audio application 150 is configured to render the assigned inputs for the audio pin as audio playback at the wearable audio device (e.g., audio device 120) worn by the user, e.g., to preview the audio playback associated with the audio pin or to experience the audio playback associated with the audio pin. Additional details of audio pins in an augmented audio environment are included in U.S. patent application Ser. No. 16/539,480 ("Augmented Audio Development Tool"), previously incorporated by reference herein.

As described herein, the augmented audio application 150 is configured to render adjustments to the inputs 310 as audio playback at the audio device 120 in real time as the inputs 310 are assigned. That is, the augmented audio application 150, via the DAW 320 and the audio device 120, enable the user 110 to perform developer-side functions to adjust the audio playback and hear the adjusted audio playback in real time as an end-user. These implementations allow the user to 110 to act as both programmer and end-user, significantly reducing the feedback loop as compared with conventional AR audio development approaches. These implementations can improve development of augmented audio environments, providing rich, immersive and responsive content for the end user.

Implementations described herein can be used in constructing an augmented audio environment, e.g., including a plurality of audio pins. In these cases, the augmented audio application 150 can also generate a map workspace on the display 170, which allows the user (e.g., programmer) to locate scenes, as well as particular experiences within those scenes, in geographic space, e.g., in a map of a location or region. These features are further described in U.S. patent application Ser. No. 16/539,480 ("Augmented Audio Development Tool"), previously incorporated by reference herein.

Triggering events are described herein according to various implementations. Satisfaction of one or more triggering events can be detected with data obtained from one or more applications running on the smart device 130 and/or sensors on the audio device 120 and/or the smart device 130. This data can include one or more of: clock data indicating a current time of day, location type data indicating a type of geographic location proximate the audio device 120, demographic data indicating at least one demographic attribute of the geographic location proximate the audio device 120, weather data indicating a weather condition proximate the audio device 120, speed data indicating a speed at which the audio device 120 is moving, relative location data indicating the audio device 120 is proximate to a plurality of additional audio devices associated with corresponding users executing a common application on the audio device 120 or a paired audio gateway (e.g., at smart device 130), celestial event data indicating a current or impending celestial event, current event data indicating a breaking news story, a new release of a product, or a new release of an artistic work, application execution data for an application executing on the audio device 120 or a paired audio gateway (e.g., at smart device 130), or data indicating proximity to an additional audio device associated with an additional user executing a common application. In a particular example, sub-events (or sub-triggers) can include interactions with the audio device 120 (e.g., double-tap of a tactile interface, nodding as detected by an IMU, voice command as detected by microphone(s)) as well as interactions with the smart device 130 (e.g., GPS signal indicates the smart device is in a particular region, or the augmented audio application 150 is open on the smart device.

In any case, the augmented audio application 150 (FIG. 1) has the technical effect of rendering one or more audio pins in the augmented audio environment based upon the set of inputs 310 (FIG. 3), for example, in response to user actuation at the audio device 120. In particular implementations, the augmented audio application 150 is configured to generate an augmented audio environment by rendering one or more pins based upon the inputs 310.

Additional details and examples related to the user experience in the augmented audio environment are described in the following patent applications, each of which is herein incorporated by reference in its entirety: U.S. patent application Ser. No. 16/267,643 ("Location-Based Personal Audio"); U.S. patent application Ser. No. 16/179,205 ("Spatialized Virtual Personal Assistant"); and U.S. patent application Ser. No. 16/289,940, previously incorporated by reference herein. Any of the above-noted inputs can be presented to the programmer in any format described herein, e.g., fillable text, slider, drop-down menu, pre-selects, etc. These inputs are described in further detail in terms of the user experience in U.S. patent application Ser. No. 16/289, 940, previously incorporated by reference herein.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., augmented audio apps) utilizing one or more input mechanisms. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built. Additional description of generalized API functionality is included in U.S. patent application Ser. No. 16/539,480 ("Augmented Audio Development Tool"), previously incorporated by reference herein.

Figure 5:
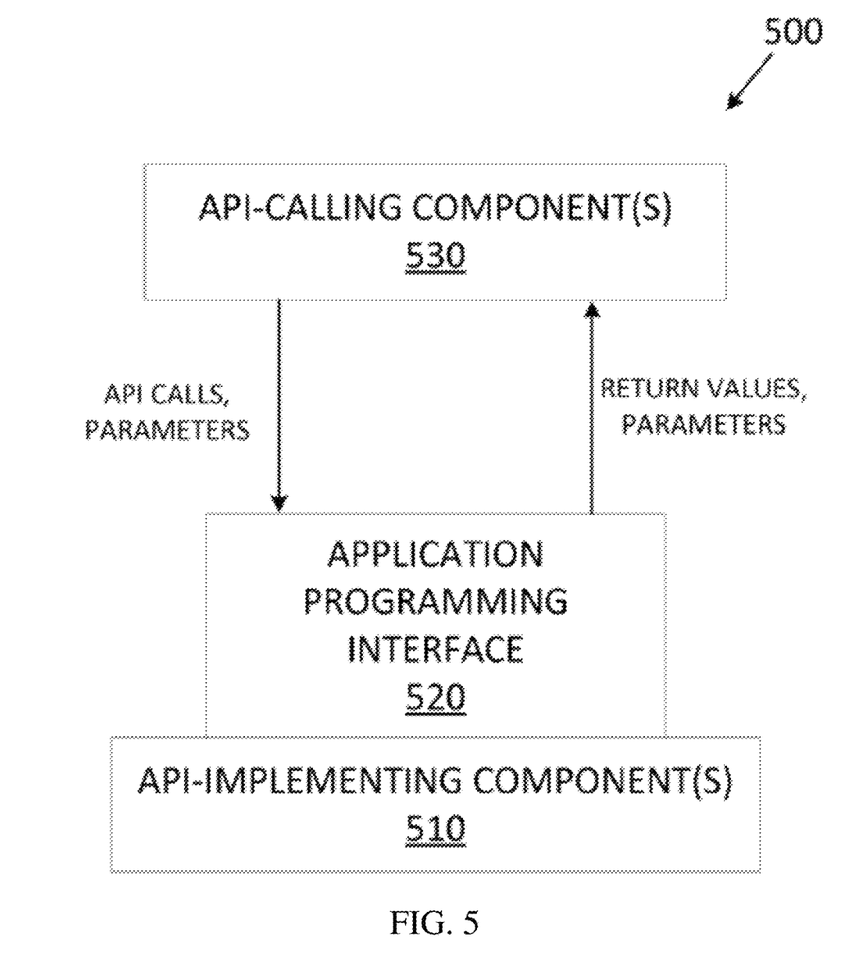
FIG. 5 is a block diagram illustrating an example API architecture used according to various implementations.

FIG. 5 is a block diagram illustrating an example API architecture, which may be used in some implementations. As shown in FIG. 5, the API architecture 500 includes the API-implementing component(s) 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component(s) 530. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

The API-implementing component 510 may include additional functions, methods, classes, data structures, and/or other features that are not specified through the API 520 and are not available to the API-calling component 530. The API-calling component 530 may be on the same system as the API-implementing component 510 or may be located remotely and accesses the API-implementing component 510 using the API 520 over a network. While FIG. 5 illustrates a single API-calling component 530 interacting with the API 520, other API-calling components, which may be written in different languages (or the same language) than the API-calling component 530, may use the API 520.

The API-implementing component 510, the API 520, and the API-calling component 530 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 6:
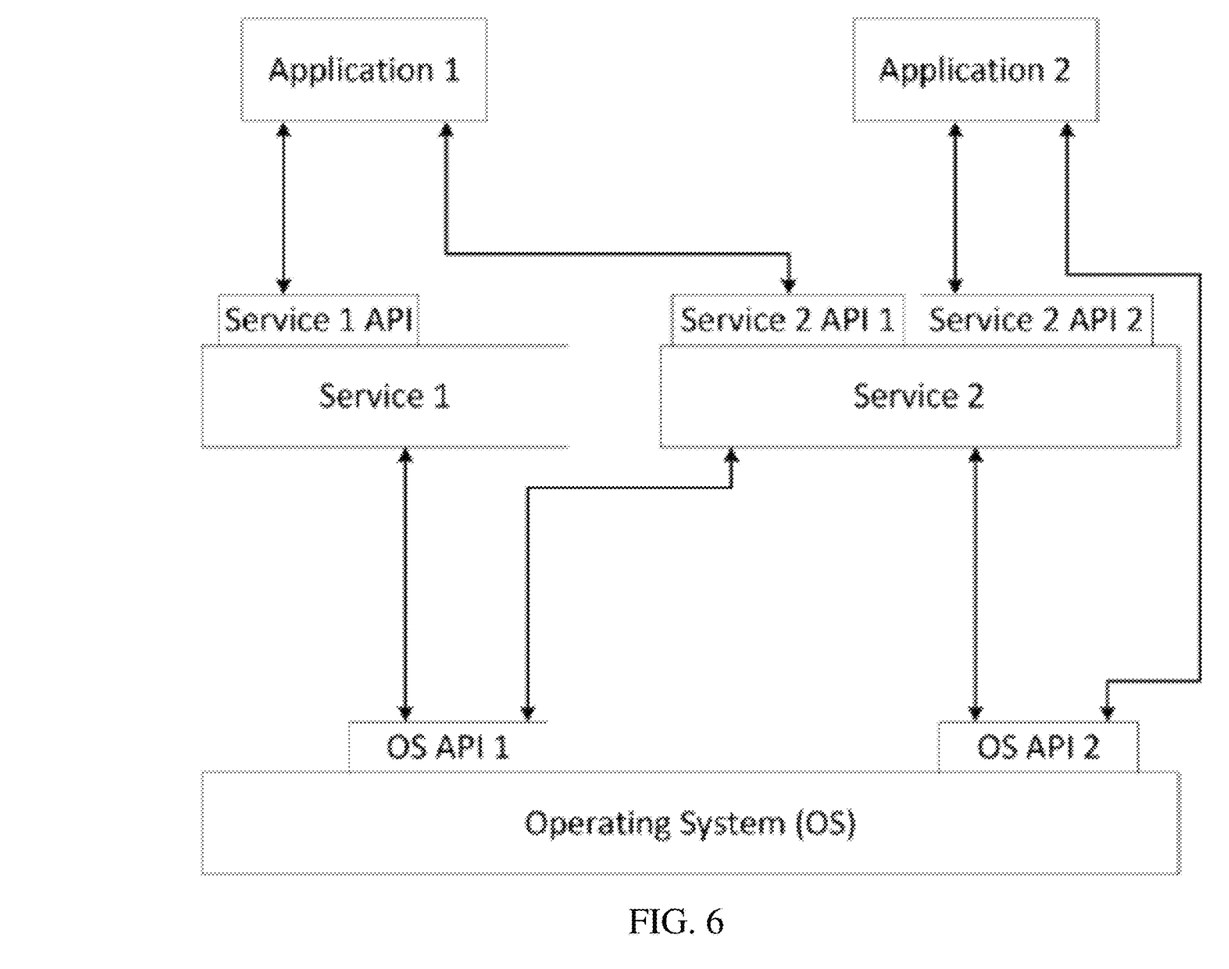
FIG. 6 is a schematic depiction of a software stack used according to various implementations.

In an example software stack shown in FIG. 6, applications can make calls to Services 1 or 2 using several Service APIs and to an Operating System (OS) using several OS APIs. Services 1 and 2 can make calls to OS using several OS APIs. In this example, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

I claim:

1. A computer-implemented method comprising:
   generating a digital audio workstation (DAW) on a display, the DAW including a set of inputs assignable to an audio pin for playback;
   receiving assigned inputs for the audio pin from selections by a user at the display or at a wearable audio device worn by the user;
   displaying a representation of the user in the DAW on the display;
   displaying a representation of the assigned inputs relative to the representation of the user in the DAW on the display;
   after receiving the assigned inputs: receiving a preview command to render the assigned inputs as audio playback at the wearable audio device worn by the user; and initiating a preview of the assigned inputs, wherein previewing the assigned inputs comprises rendering the assigned inputs as audio playback at the wearable audio device worn by the user to preview the audio playback associated with the audio pin, wherein the set of inputs are configured to be rendered as audio playback at the wearable audio device worn by the user in real time as the inputs are assigned; and
   determining an orientation of the user based upon orientation data from the wearable audio device, wherein the representation of the user in the DAW is based upon the orientation data, wherein the assigned inputs are rendered as spatialized audio at the wearable audio device based upon the representation of the assigned inputs relative to the representation of the user in the DAW,
   wherein in response to physical movement by the user while wearing the wearable audio device:
      updating of the representation of the user in the DAW, and updating the spatialized audio based upon a detected proximity of the representation of the user to at least one of the assigned inputs and a detected orientation of the user relative to the at least one of the assigned inputs, wherein updating the spatialized audio comprises adjusting a directionality of the audio playback from each assigned input based on a detected change in at least one of proximity of the representation of the user or orientation of the depiction of the user relative to each assigned input in the DAW.

2. The computer-implemented method of claim 1, wherein adjustments to the set of inputs are configured to be rendered as audio playback at the wearable audio device worn by the user in real time as the inputs are assigned.

3. The computer-implemented method of claim 1, wherein the set of inputs comprise audio content selections assignable to the audio pin, wherein the audio content selections comprise quad audio, stereo audio or mono audio, wherein the set of inputs further comprises:
   a position of each of the audio content selections;
   a volume level for each of the audio content selections; and
   a triggering mechanism for playback of at least one of the audio content selections.

4. The computer-implemented method of claim 1, further comprising converting the assigned inputs to an audio file for subsequent rendering as the audio playback,
   wherein converting the assigned inputs to a stereo audio file is performed at a cloud computing system connected with the wearable audio device.

5. The computer-implemented method of claim 4, wherein the stereo audio file comprise multiple channels configured for spatialized playback.

6. The computer-implemented method of claim 1, wherein the display is located on a smart device.

7. The computer-implemented method of claim 1, wherein the DAW is part of an application programming interface (API) that allows an API-calling component to render the assigned inputs as audio playback at the wearable audio device.

8. The computer-implemented method of claim 1, wherein the DAW and the wearable audio device enable the user to perform developer-side functions to adjust the audio playback and hear the adjusted audio playback in real time as an end-user, wherein the real time adjusted audio playback is available in less than approximately 150 milliseconds after an input is assigned.

9. The computer-implemented method of claim 1, further comprising assigning, with a transcoder/encoder, the audio pin to a scene in an augmented audio environment for subsequent playback to the user wearing the wearable audio device or a distinct user.

10. The computer-implemented method of claim 9, wherein the audio pin is assigned to a geographic location and is configured to be triggered by the distinct user when the distinct user is located proximate the geographic location in the augmented audio environment.

11. The computer-implemented method of claim 1, further comprising:
   assigning the audio pin to a scene in an augmented audio environment, wherein the audio pin is one a plurality of audio pins in the augmented audio environment each with assigned inputs; and
   in response to detecting movement of the user to a location associated with one or more of the plurality of audio pins, rendering the assigned inputs for the audio pin as audio playback at the wearable audio device worn by the user to preview the audio playback associated with the audio pin.

12. A system comprising:
   a smart device comprising a display for displaying a digital audio workstation (DAW) comprising a set of inputs assignable to an audio pin for playback; and a wearable audio device connected with the smart device, the wearable audio device comprising:
  at least one electro-acoustic transducer configured to provide an audio output;
  an orientation tracking system for tracking an orientation of a user; and
  a control system coupled with the at least one electro-acoustic transducer and the orientation tracking system, the control system comprising: a processor, and memory storing instructions, wherein the processor is configured to execute the instructions to perform functions including:
    send orientation tracking data about the user to the smart device, the smart device displaying a representation of the user in the DAW,
    wherein the smart device further displays a representation of the assigned inputs relative to the representation of the user in the DAW on the display, wherein the representation of the user in the DAW is based upon the orientation tracking data;
    receive a preview command to render the assigned inputs as audio playback at the wearable audio device worn by the user, the preview command comprising instructions from the smart device to initiate audio playback of at least one assigned input in the set of inputs based upon the orientation tracking data and a representation of the at least one assigned input relative to the representation of the user in the DAW; and
    initiate a preview of the assigned inputs, the initiating of the preview comprising initiating audio playback of the at least one assigned input at the at least one electro-acoustic transducer,
      wherein the at least one assigned input is configured to be rendered as audio playback at the at least one electro-acoustic transducer in real time as each input is assigned, wherein the assigned inputs are rendered as spatialized audio at the wearable audio device based upon the representation of the assigned inputs relative to the representation of the user in the DAW, wherein in response to physical movement by the user while wearing the wearable audio device:
        updating of the representation of the user in the DAW, and updating the spatialized audio based upon a detected proximity of the representation of the user to at least one of the assigned inputs and a detected orientation of the user relative to the at least one of the assigned inputs, wherein updating the spatialized audio comprises adjusting a directionality of the audio playback from each assigned input based on a detected change in at least one of proximity of the representation of the user or orientation of the depiction of the user relative to each assigned input in the DAW.

13. The system of claim 12, wherein the at least one electro-acoustic transducer plays back the at least one assigned input as spatialized audio based upon the representation of the assigned set of inputs relative to the representation of the user in the DAW, wherein each input is able to be rendered as audio playback at the wearable audio device within approximately 150 milliseconds after being assigned.

14. The method of claim 1, wherein the preview command is enabled within approximately 150 milliseconds after the inputs are assigned.

* * * * *